(12) United States Patent
Schmitz

(10) Patent No.: US 6,510,037 B1
(45) Date of Patent: Jan. 21, 2003

(54) METHOD FOR MONITORING AN ELECTROMAGNETIC ACTUATOR

(75) Inventor: Günter Schmitz, Aachen (DE)

(73) Assignee: FEV Motorentechnik GmbH, Aachen (DE)

(*) Notice: Subject to any disclaimer, the term of this patent is extended or adjusted under 35 U.S.C. 154(b) by 0 days.

(21) Appl. No.: 09/230,972

(22) Filed: Feb. 4, 1999

(30) Foreign Application Priority Data

Jun. 5, 1997 (DE) .......................... 197 23 563

(51) Int. Cl.$^7$ ............................... F02D 41/20
(52) U.S. Cl. ........................ 361/160; 361/154
(58) Field of Search ............... 361/152–156, 361/160

(56) References Cited

U.S. PATENT DOCUMENTS

| | | | |
|---|---|---|---|
| 5,469,825 A | * 11/1995 | Golab et al. | 361/154 |
| 5,621,603 A | * 4/1997 | Adamec et al. | 361/154 |
| 5,701,870 A | * 12/1997 | Gottshall et al. | 361/154 |

FOREIGN PATENT DOCUMENTS

| | | |
|---|---|---|
| EP | 0 358 972 | 3/1990 |
| EP | 0 408 962 | 1/1991 |
| FR | 2 345 595 | 10/1977 |
| JP | 0600178947 | 9/1985 |
| JP | 0610004845 | 1/1986 |

* cited by examiner

*Primary Examiner*—Fritz Fleming
(74) *Attorney, Agent, or Firm*—Venable; Norman N. Kunitz (57) ABSTRACT

The invention relates to a method for monitoring an electromagnetic actuator having at least one electromagnet. This electromagnet acts on an armature, which is displaceable against the force of at least one pull-back spring, and is used for operating an actuator, in particular an electromagnetic actuator for operating a gas exchange valve on the cylinder of an internal combustion engine. In accordance with this method, the electric power of the magnet is controlled via an electric control system. The other electric power parameter, which depends on the controlled electric power parameter, serves as a monitoring parameter, and its curve in time is determined as an actual value, which is then compared with a theoretical value. This theoretical value is the curve in time preset in the control system to ensure correct functioning. In the case of a discrepancy between these two values, an adjustment signal is produced.

6 Claims, 8 Drawing Sheets

METHOD FOR MONITORING AN ELECTROMAGNETIC ACTUATOR

BACKGROUND OF THE INVENTION

With the increasing use of electromagnetic actuators for actuating final control elements, and particularly with the use of such electromagnetic actuators to actuate the gas exchange valves of piston-type internal combustion engines, the necessity arises of monitoring functional problems or failures of an actuator during operation and initiating appropriate provisions if a malfunction occurs.

SUMMARY OF THE INVENTION

According to the invention, a method is proposed for monitoring the function of an electromagnetic actuator having at least one electromagnet, which acts upon an armature, movable counter to the force of at least one restoring spring, to actuate a final control element, in particular an electromagnetic actuator for actuating a gas exchange valve of a cylinder of a piston-type internal combustion engine, in which the electrical power of the magnet is controlled via an electric controller, wherein as a monitoring parameter, the other electric power parameter, dependent on the controlled electric power parameter, is detected in its course over time as an actual value and compared with the course over time, predetermined in the controller for proper function, of the monitoring parameter as a theoretical value, and if a deviation occurs, an actuating signal is generated. In this method, the fact that the other electric power parameter, such as the voltage established at the coil, that is dependent on the controlled electric power parameter, such as the current, has significant deviations if the armature on approaching the pole face of the intercepting magnet until contact with the pole face does not perform "properly". Since on the other hand it is possible for the course over time of the monitoring parameter, given proper function of the electromagnetic actuator, to be stored as a memorized theoretical value in the electric controller, a theoretical value for "proper" functioning is simultaneously made available. This theoretical value allows ongoing, uninterrupted monitoring of a single electromagnetic actuator during operation. Since deviations between the course over time of the monitoring parameter detected as the actual value from the course over time of the monitoring parameter present in the form of the theoretical value are immediately apparent in an operating situation that can be assessed as a problem, it is also possible to trip a corresponding actuating signal. The possibility then also exists of specifying a certain tolerance range, which allows further operation even if a slight deviation of the actual value from the theoretical value is ascertained. Once again, the possibility exists of initially merely detecting slight deviations and storing them in memory in their order over time and then to trip an actuating signal, for instance in the form of a display, whenever such deviations in the actual value from the theoretical value accumulate while still within the predetermined tolerance limit. The particular advantage of the method of the invention over other methods is that here problems or anomalies in operation can be detected during the entire time an electromagnetic actuator is on. Even a delayed arrival of the armature at the pole face caused for instance by increased friction, or a reverse motion of the armature without touching the pole face, or bouncing of the armature immediately after it strikes the pole face, or a premature drop of the armature if the holding current is too low, or seizing of the armature on the pole face of the electromagnet if a restoring spring breaks, can thus be detected immediately.

In one feature of the invention, it is provided that in control via the current, as the monitoring parameter, the course over time of the voltage applied to the coil is detected as the actual value and compared with the predetermined course of the voltage over time, given proper function, as the theoretical value. In this method, the fact that the course over time of the voltage has marked deviations at the coil of the electromagnet because of the induced contrary voltage is advantageously exploited if deviations in the motion of the armature are to be ascertained.

In another feature of the invention, it is provided that in control of the voltage, as the monitoring parameter, the course over time of the current flowing through the coil is detected as the actual value and is compared with the predetermined course of the current, as the theoretical value. In this design of the electric controller as well, the linkage of current and voltage by Ohm's law results in marked deviation of the detected actual value from the predetermined theoretical value if the armature motion is not proper.

Both when the current is controlled and when the voltage is controlled, upon the approach of the armature to the pole face an additional voltage is induced, which leads to a distortion in the course over time of the electric power parameter detected as a monitoring parameter. Both in control via the current and in control via the voltage, this causes corresponding changes in the course over time of the actual value.

The further advantage of the method of the invention is that instead of the particular electric power parameters to be detected, their proportional magnitudes can also be picked up in the associated electric controller. For instance, if to control the current in the case of so-called linear current regulation the electric controller has a PID regulator, then any actual value deviations can also be picked up from the P and/or I and/or D component of the regulator.

In another feature of the invention, it is provided that in clocked control of the current, at least in the holding phase between an upper and a lower current level, for the monitoring parameter the sequence of the respective voltage rise, given proper function, of successive pulses is detected as an actual value and compared with a predetermined theoretical value of the sequence over time. This feature of the method is especially expedient whenever, because of the specification by the controller, it can be assumed with reliability that the armature will indeed come to contact the pole face of the electromagnet, and otherwise the controller is designed such that to reduce the requisite electrical energy during the holding phase, in which a reduced magnetic force is needed at the electromagnet, a reduced supply of current is effected, which furthermore is closed between two different current levels; that is, the current supply is turned off as soon as the upper current level is reached and is turned on again, when the current, because of the losses, has dropped down to a lower value again. As soon as the armature contacts the pole face, or in other words is securely held, a constant chronological order is obtained for the voltage rise each time the holding current in the clocking phase is turned on. If the armature drops during the holding phase, then because of the armature motion and the contrary voltage thus induced, a premature drop in the voltage occurs with the turnoff of the holding current, and there is a premature rise in the voltage when the holding current is turned on. If clocking is already done in the interception phase, then accordingly anomalies of motion of the armature in its approach to the pole face can be detected in same way, from deviations in the time sequence of the voltage rise and also the voltage drop in the applicable clocking. The direct evaluation of the switching signals, that is, the various on and off signals, is also advantageous.

In a feature of the invention, it is provided that if a predetermined deviation between the actual value and the theoretical value of the monitoring parameter is exceeded, the regulated electric power parameter is reregulated via the electric controller. For instance, if there is a deviation between the actual value and the theoretical value of the monitoring parameter and it is found that the armature "bounces" on striking the pole face, this means that an excessively high current or voltage is being delivered to the electromagnet, so that a remedy is possible here via a suitable intervention in the electric control. If on the other hand it is found that the armature is moving but has not attained contact with the pole face, then once again the possibility exists of increasing the controlled electric power parameter accordingly via the electric controller, so as to make a greater magnetic force available.

In a further advantageous feature of the invention, in particular in an electromagnetic actuator for actuating a gas exchange valve at a cylinder of a piston engine, it is provided that is a predetermined deviation between the actual value and the theoretical value of the monitoring parameter is exceeded, the other functions at the cylinder, in particular, fuel delivery and/or ignition and/or the electromagnetic actuator for the other gas exchange valve are turned off via the electric controller. Particularly the shutoff of delivery of further quantities of fuel to the applicable cylinder assures that damage to the exhaust system, in particular the catalytic converter system, and damage from overheating of the catalytic converter. If at the same time the electromagnetic actuator turns off the other gas exchange valve at this cylinder, then both gas exchange valves remain in the open position, for instance, and thus the applicable cylinder that has been turned off runs empty and because of the absence of compression in the cylinder contents does not have a breaking effect.

Since particularly in vehicle with piston engines that are provided with an electric controller, not only the gas exchange valves, but also, as a function of the power specified by the driver via the gas pedal, the fuel quantity, instead of ignition, valve opening times, and in particular here the chronological overlaps in the opening times of the gas inlet valve and gas outlet valve, are triggered by the electric triggering, the method of the invention also offers the advantage that when the functions of a cylinder are turned off, the power of the cylinders of the piston engine that are still working is increased, within certain limits, via the electric controller. The possibility thus exists, regardless of the power specified by the gas pedal, of automatically adjusting the individual control parameters automatically, in the event of failure of only one cylinder, via a suitable control command in the electronic controller, so that the piston engine can continue to be operated with virtually the same power despite the failure of one cylinder, and a perceptible delay in vehicle speed is not brought about by a sudden power drop if one cylinder fails.

BRIEF DESCRIPTION OF THE DRAWINGS

The invention will be described in further detail in conjunction with the schematic drawings. Shown are.

DETAILED DESCRIPTION OF THE PREFERRED EMBODIMENTS

Figure 1:
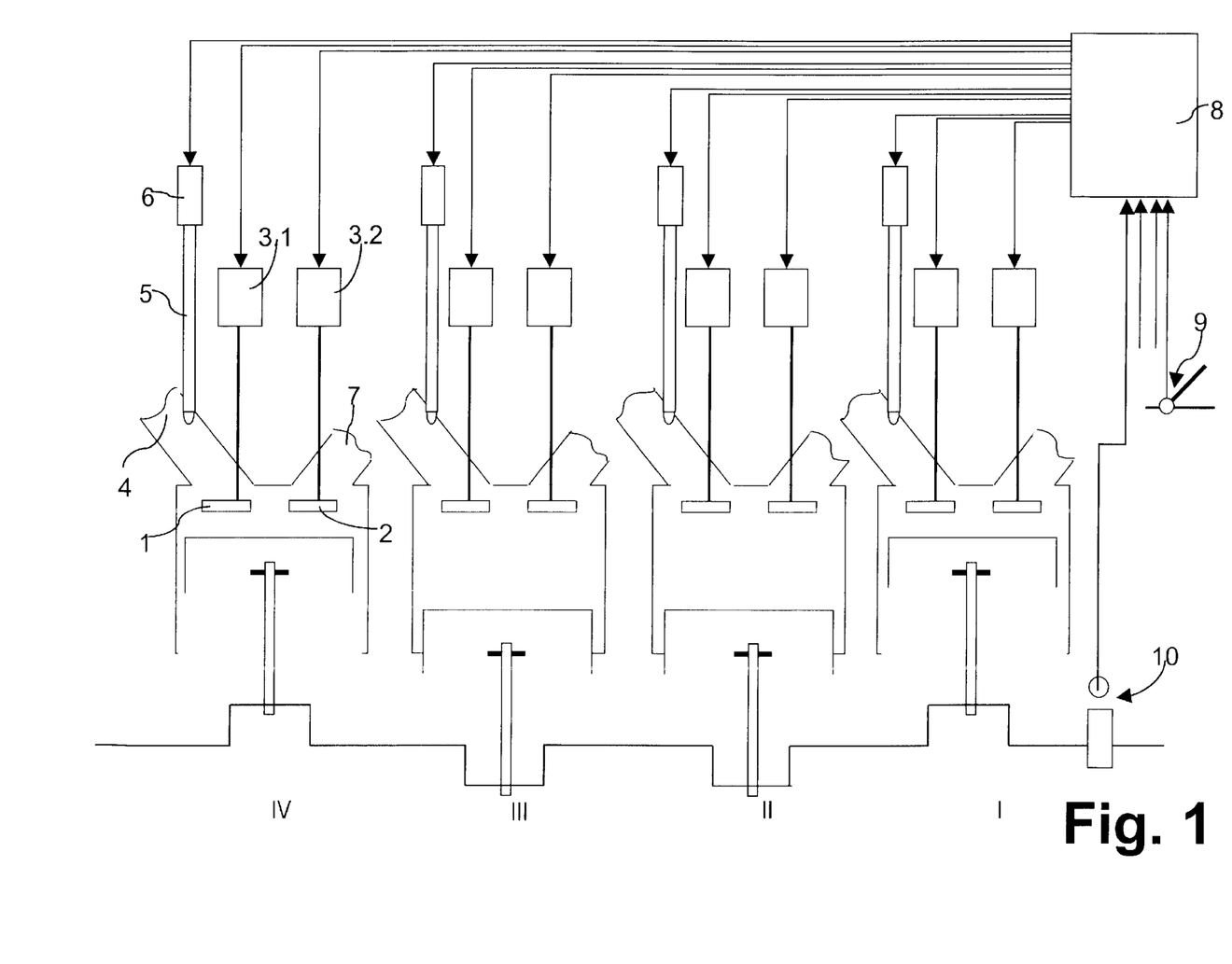
FIG. 1, a basic drawing of a four-cylinder, four-stroke Otto engine with electromagnetic actuators for the gas exchange valves.

In FIG. 1, a four-stroke, four-cylinder Otto engine is schematically represented by its cylinders I, II, III, IV. The individual cylinders each have one gas inlet valve 1 and one gas outlet valve 2; the two gas exchange valves 1, 2 are each actuatable via a respective electromagnetic actuator 3.1 and 3.2. The gas inlet valve 1 closes a gas inlet conduit 4, into which an injection nozzle 5 discharges, and the nozzle is in turn actuatable via an electromagnetic actuator 6. The gas outlet valve 2 closes a gas outlet conduit 7.

The electromagnetic actuators 3.1 and 3.2 of the gas exchange valves and the electromagnetic actuators 6 of the fuel injection nozzles 5 are all triggered via an electric control unit 8, which receives the load specification desired at the time, for instance via a gas pedal 9. As is usual in modern electronic engine control systems, the electric control unit 8 is also supplied with other data required for operation, such as the torque being output, the coolant temperature, and other values required for optimal open- and closed-loop control of the course of operation. The instantaneous engine rpm is also delivered to the controller via a suitable transducer 10. Via this rpm transducer, the crankshaft position and thus the piston position of at least one cylinder can be specified at the same time, so that precision-fitted, precisely timed, rpm-proportional triggering of the individual electromagnetic actuators is possible, along with an operation-dependent but mutually independent variation in the actuating times of the various gas inlet valves and gas outlet valves at the individual cylinders.

Figure 2:
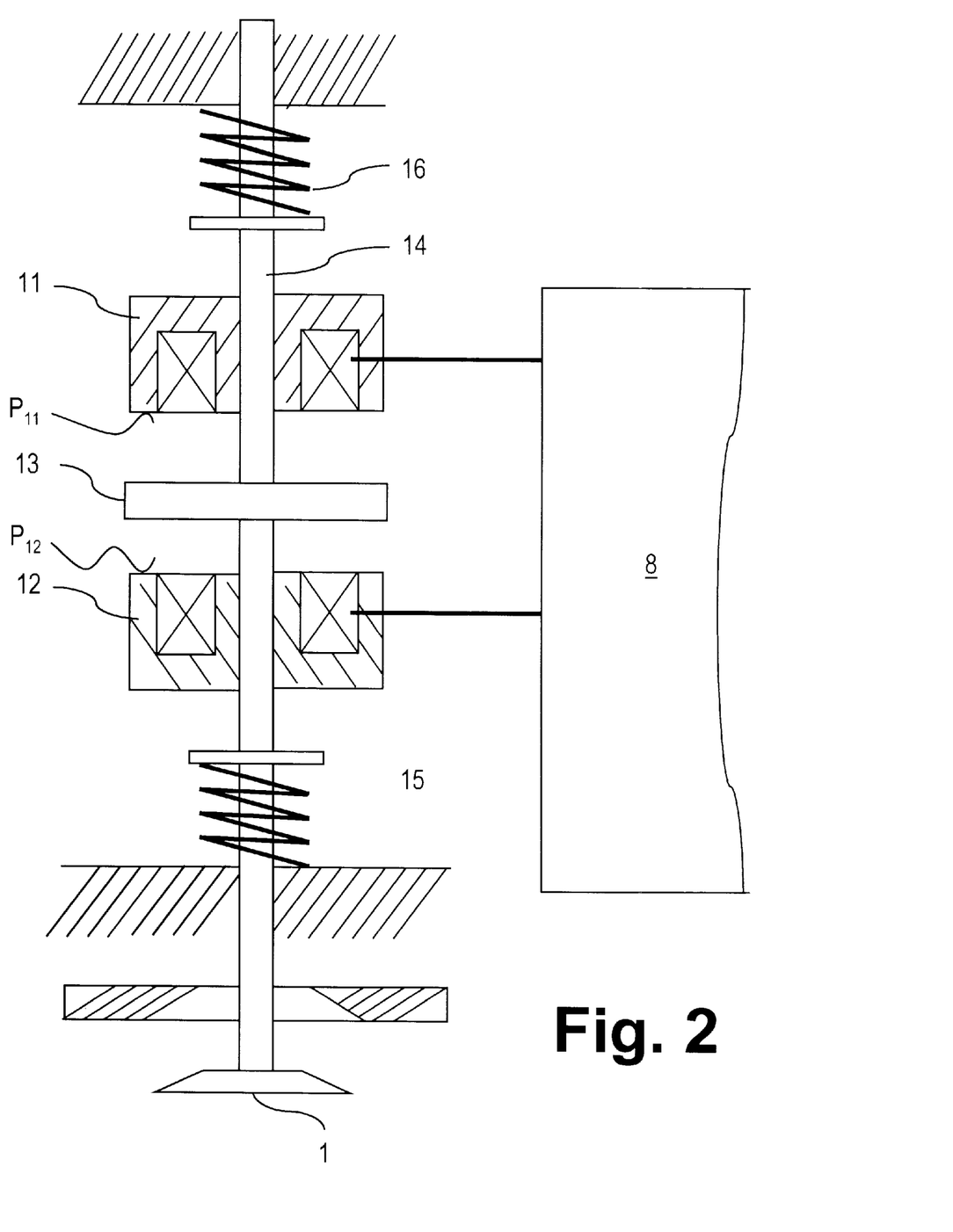
FIG. 2, an electromagnetic actuator in section on a larger scale.

As seen from FIG. 2, the electromagnetic actuator of a gas exchange valve substantially comprises two spaced-apart electromagnets 11 and 12, which face one another with their pole faces P11 and P12. Between the two electromagnets 11 and 12, an armature 13 is guided to move back and forth; via an actuating rod 14, it acts on a gas exchange valve, such as the gas inlet valve. The gas exchange valve is connected to a closing spring 15, which seeks to urge the gas exchange valve in the closing position. The closing spring 15 is assigned an opening spring 16, whose force action is counter to that of the closing spring 15. When the electromagnets are without current, the armature 13 thus assumes a middle position between the two electromagnets. The spring 16 acts as a restoring spring with regard to the electromagnet 11 acting as a closing magnet, and correspondingly the closing spring 15 acts as a restoring spring for the electromagnet acting as an opener magnet 12. If the two electromagnets are supplied with current in alternation via the electric control unit 8, then the gas exchange valve can be opened and closed according to the cadence predetermined by the electric controller 8. The electric power for building up the requisite magnetic field can now be brought about either via a controlled supply of current or via controlling the requisite voltage. Since the actual ohmic resistance and the inductance of the respective electromagnet are both fixedly defined, when there is a control delivery of current a corresponding course of the voltage over time results. If control is effected via the voltage, then there is a correspondingly dependent course of the current, so that if any functional problems are expressed immediately in a change in armature motion, respective deviations in the dependent electric power parameter make themselves felt.

Figure 3A:
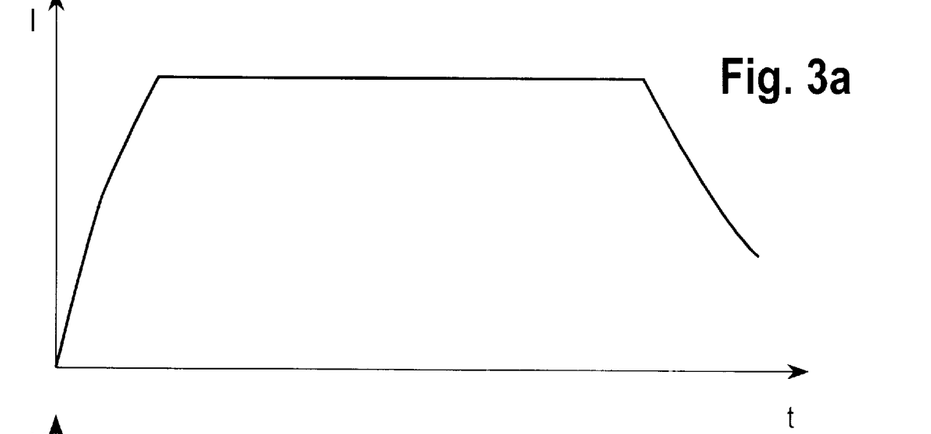
FIGS. 3a–3c, the course over time of the current and voltage when the current is controlled to actuate the electromagnetic actuator.
Figure 3B:
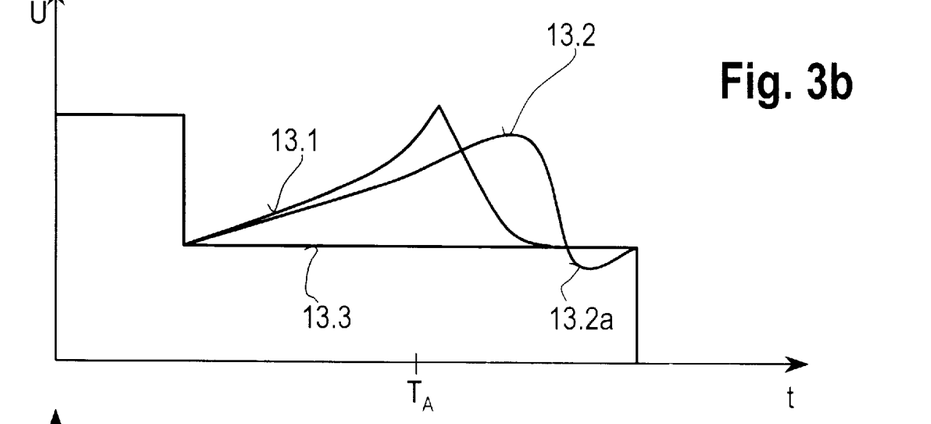
Figure 3C:
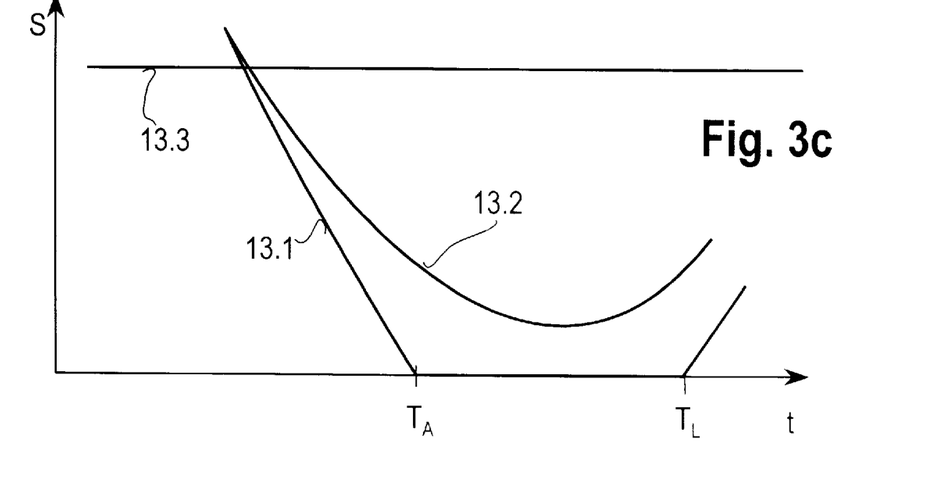

In FIG. 3a–3c, the linkage among the individual values are shown for a controlled delivery of current. If the current, in accordance with the graph in FIG. 3a, is turned on upon an approach of the armature 13 out of the middle position toward the electromagnet 12, and the current is raised to a predetermined value and then held there during the holding phase at a constant level, the result is the course of the voltage over time shown in the graph shown in FIG. 3b.

In FIG. 3c, the associated travel of the armature 3 is shown as a function of time. In "proper" function of the electromagnetic actuator, a course of the armature motion represented by the curve 13.1 in FIG. 3c results. At time $T_A$, the armature meets the pole face P12 of the electromagnet 12 and is held on the pole face.

The armature motion represented by curve 13.1 in FIG. 3c is equivalent to that in FIG. 3b of the course over time of the voltage corresponding to the curved portion 13.1.

However, if the armature 3 moves as represented by the motion curve 13.2 in FIG. 3c, where the armature just barely fails to contact the pole face P12, then the result is a significant change in the course over time of the voltage, as can be seen from the curve 13.2 in FIG. 3b. The reason for this major change is that as a consequence of the low approach speed of the armature 13, the change in the magnetic induction of the complete magnet-armature system is correspondingly less, which leads to the marked change in the voltage rise.

If the armature 13 has come to rest because of a malfunction, and for instance if it is still in contact with the pole face P11 in the event of a break of the restoring spring 16, then no armature motion whatever results, as can be seen from curve 13.3 in FIG. 3c. Because of the absence of a change in the magnetic induction when current is supplied to the electromagnet 12, there is accordingly no change in voltage, and thus the course 13.3 shown in FIG. 3b and deviating markedly from the normal course, results for the voltage dependent on the current supplied.

If the voltage curve 13.1 in the electric controller 8 is now "stored in memory" as a theoretical value, then in the event of a deviation in accordance with curve 13.2 or curve 13.3 in FIG. 13b, a corresponding actuating signal can be tripped. Thus for instance if curve 13.2 deviates from curve 13.1, the latter still being within a certain tolerance limit, the attempt can be made by increasing the current upon the next working stroke to make the armature 13 again come into proper contact. However, if the deviation in curve 13.2 is outside the predetermined tolerance value, then the course of curve 13.3 is the result, and as the actuating signal a shutoff in the function of the associated cylinder is effected.

If for instance the gas inlet valve 1 on cylinder IV of FIG. 1 fails, then via the actuating signal the fuel injection through the injection nozzle 5 is immediately inactivated; the ignition, not shown in further detail here, is turned off; and the electromagnetic actuator 3.2 of the gas outlet valve 2 is also turned off, so that at least the gas outlet valve remains in the open position and on further engine operation via the remaining, functional cylinders, the failed cylinder can continue to be turned without compression.

Since as already indicated above all the parameters relevant to operation are present in the electric controller 8, it is even possible, via suitable process computers, to increase the power of the remaining three cylinders, if one cylinder fails, to virtually compensate for the power of the failed cylinder 4 by means of a suitable change, that is, an increase in the fuel delivery to the remaining cylinders and the changes required for this purpose in the valve control times.

Beginning with the various valve motions, described in conjunction with FIG. 3c and which are shown identically in FIG. 4c, the dependency of the power parameters on one another will be described, in the event that as in FIG. 4a, when current is supplied to whichever electromagnet is active, the voltage is controlled (FIG. 4a), so that in accordance with the total impedance of the electromagnet, the dependency shown in FIG. 4b for the course of the current over time is the result.

Figure 4A:
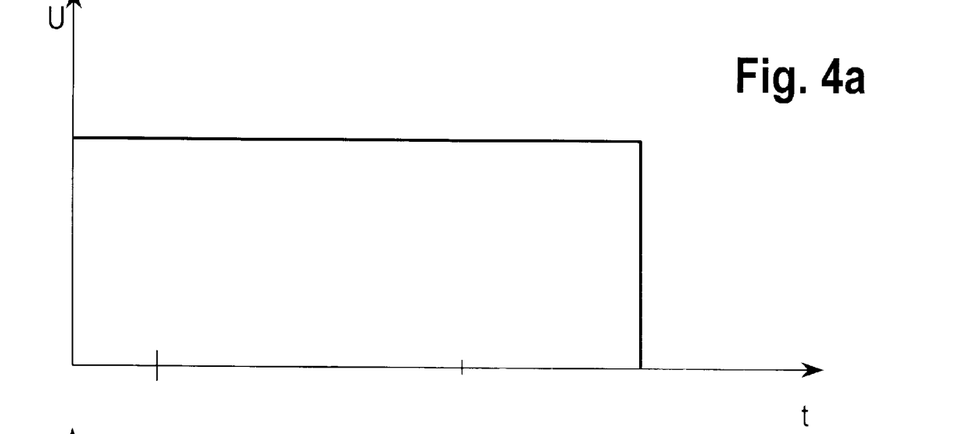
FIGS. 4a–4c, the course over time of the current and voltage when voltage is controlled to actuate the electromagnetic actuator.

As FIG. 4a shows, a voltage of suitable level is applied to the coil, for instance of the electromagnet 13, so that a correspondingly rising current flows through the coil. If the electromagnetic actuator is functioning properly, that is, if the motion curve 13.1 shown in FIG. 4c is the result, then the change in inductance through the approaching armature causes a marked drop in the current, as represented by curve 13.1 in FIG. 4b.

Figure 4B:
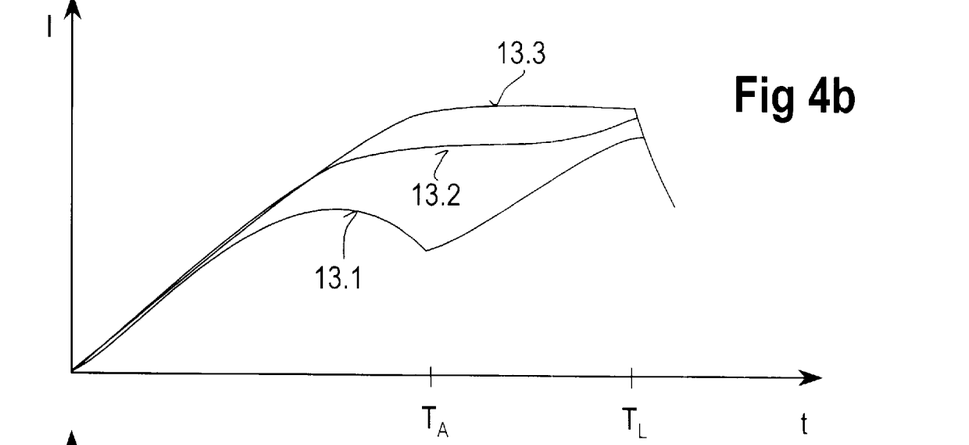
Figure 4C:
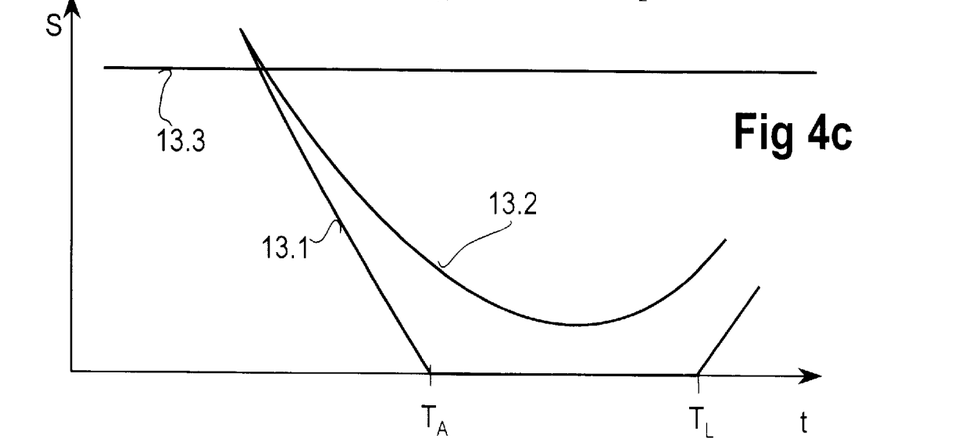

If only an approach represented by curve 13.2 in FIG. 4c takes place, then necessarily, if the voltage is kept constant at the electromagnet via the electric controller, a current course represented by curve 13.2 in FIG. 4b results.

If no armature motion ensues, as represented by curve 13.3 in FIG. 4c, then the result is a continuously rising course of the current flow through it, as represented by curve 13.3 in FIG. 4b.

Once again, there are significant, marked differences in the course over time of the current flow, which make not only proper contact of the armature with the pole face but also an approach of the armature without contact and a complete functional failure detectable.

Comparing the diagrams in FIGS. 3a–3c and FIGS. 4a–4c shows that the particular power parameter controlled (the current in FIGS. 3a–3c, the voltage in FIGS. 4a–4c) the other electric power parameter dependent on it (in FIG. 3, the voltage and in FIG. 4, the current) has marked deviations from the normal course or the course recognized as "proper", so that his "proper" course can be "stored in memory" as a theoretical value in the electric controller 8. The actual course over time can also be detected as an "actual value" in ongoing operation in each working cycle of the electromagnetic actuator as well and compared with the memorized theoretical value; because of the marked differences that occur in the event of defective function, an actuating signal is tripped as described above, and suitable open- and closed-loop control provisions can be taken via the electric control unit 8.

Figure 5A:
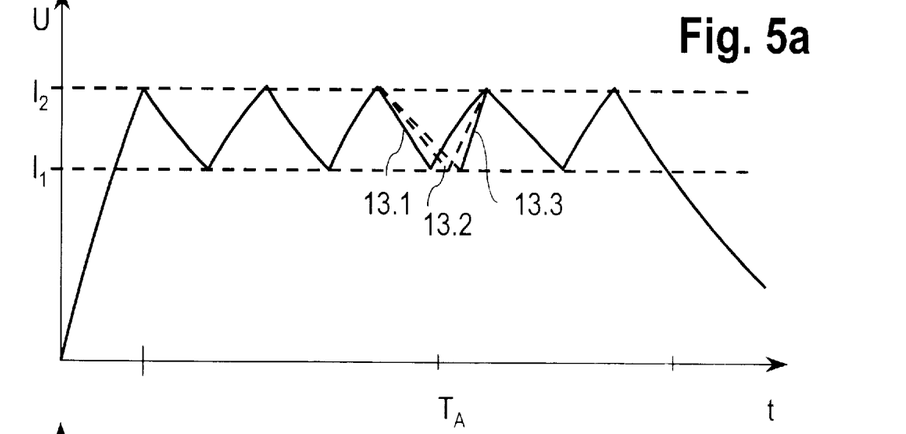
FIGS. 5a–5c, the course over time of the voltage in clocked current supply to the electromagnetic actuator.
Figure 5B:
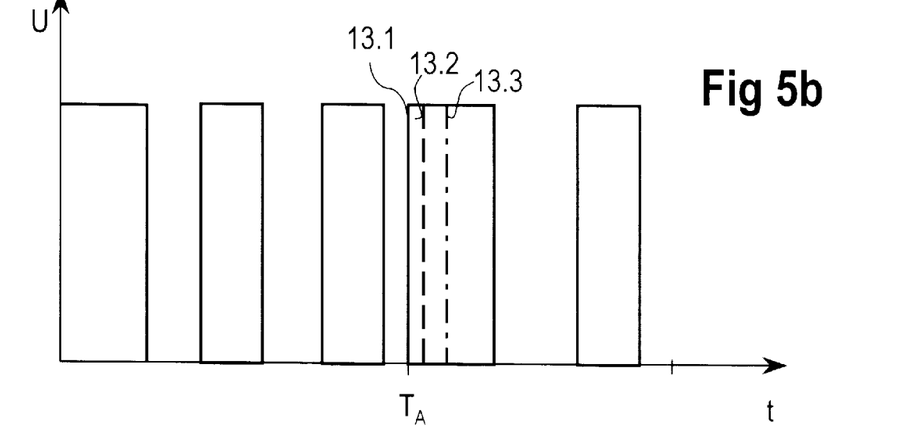
Figure 5C:
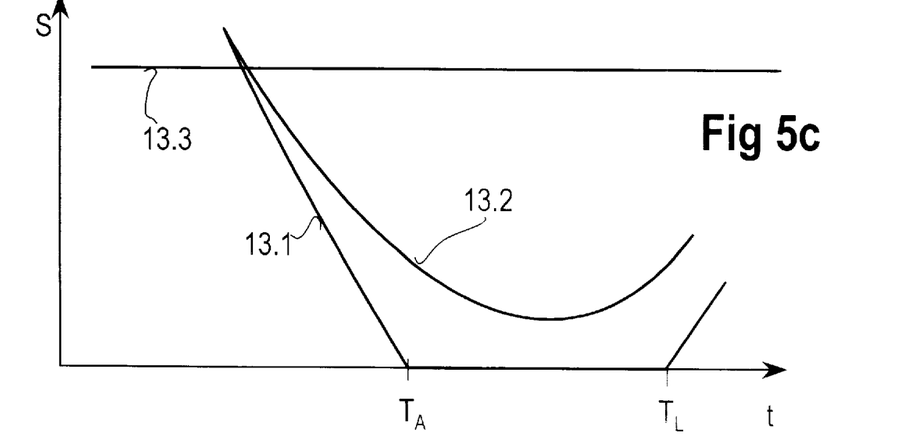

If in FIG. 3a, in the approach and holding phase for the armature 13, in a departure from the constant-current closed-loop control shown and described in FIGS. 3a–3c, the current is clocked between an upper and a lower level as shown in FIGS. 5a–c, then the result, for the different courses of motion for the armature already shown above in conjunction with FIGS. 3c and 4c and corresponding to FIG. 5c, is also a corresponding change in the course of the voltage. The control here is effected in such a way that the holding current is clocked between an upper value $I_2$ and a lower value $I_1$, in such a way that upon attainment of the upper current value $I_2$, the current is turned off, and upon attainment of the lower value $I_1$, the current is turned back on again. If there are no changes in magnetic inductance in the region of the electromagnet, the result is a constant course over time of the front signal edge $U_e$. However, if the armature moves toward the electromagnet in this clocking phase in accordance with the curve 13.1 in FIG. 5c, this causes a greater drop in the current course curve, as represented by the curve segment 13.1 in FIG. 5a. The result of this is that the current level $I_1$ is reached earlier, and correspondingly the voltage is reapplied sooner, so that the leading edge $U_{e1}$ appears earlier.

Upon a motion course represented by curve 13.2, there is still a major shift in the leading edge of the voltage signal $U_{e2}$, but this takes place markedly later than the turn-on time $U_{e1}$ to be associated with proper operation.

If in accordance with curve 13.3 in FIG. 5c no armature motion occurs, then no shift in the turn-on time occurs, so that the presence of a malfunction can be concluded from the fact that no deviation has occurred.

Since as described above in conjunction with FIG. 1, the expected contact time $T_A$, given proper function, can be predetermined in the context of the theoretical value specification via the electric controller 8 for each electromagnetic actuator on the basis of the engine rpm detected and on the basis of the triggering, it suffices for the actual/theoretical value comparison in this procedure, to monitor the period of time, shown in FIG. 5c, between $T_f$ and $T_1$ to monitor the chronological sequence of the voltage rise, since the above-described changes can occur only within this period.

As the above explanations made in conjunction with FIGS. 3a–3c, 4a–4c and 5a–5c show, the method of the invention can be employed not only for the motion procedure of "armature interception and contact", but also for the motion procedure of "armature release".

Figure 6A:
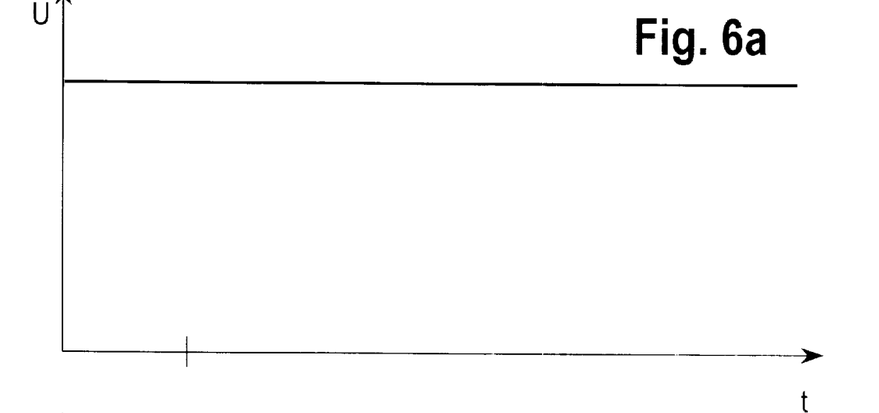
FIGS. 6a–6c, 7a–7c and 8a–8c, corresponding graphs in the event of an unintended drop of the armature.
Figure 6B:
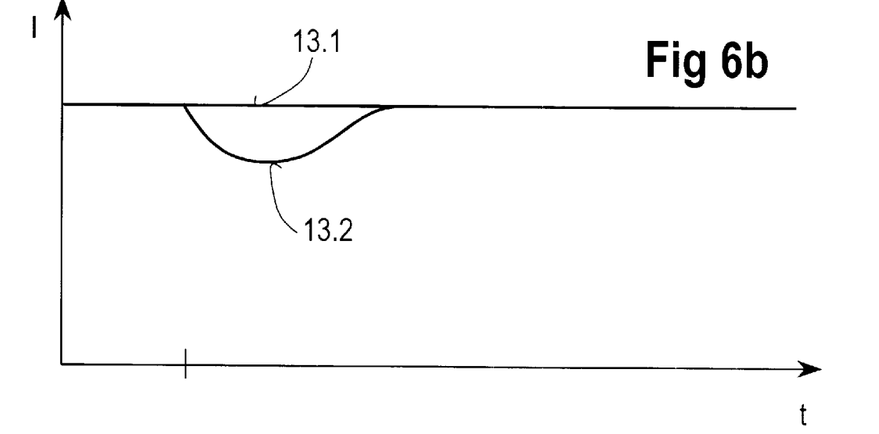
Figure 6C:
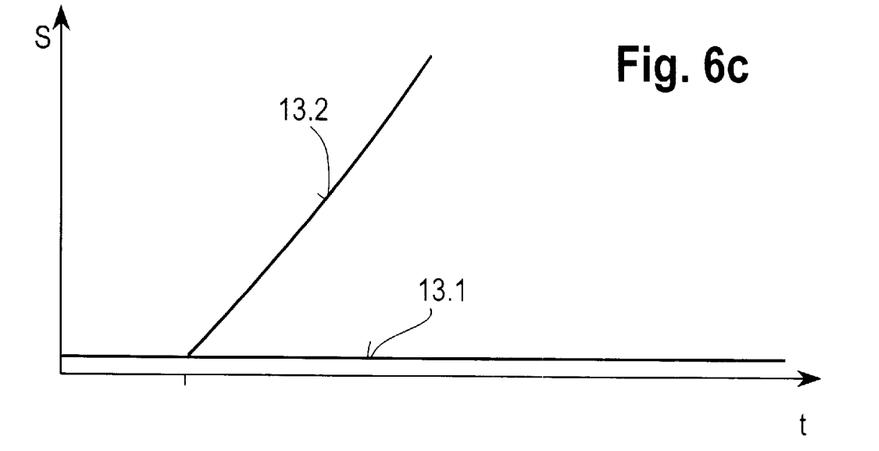
Figure 7A:
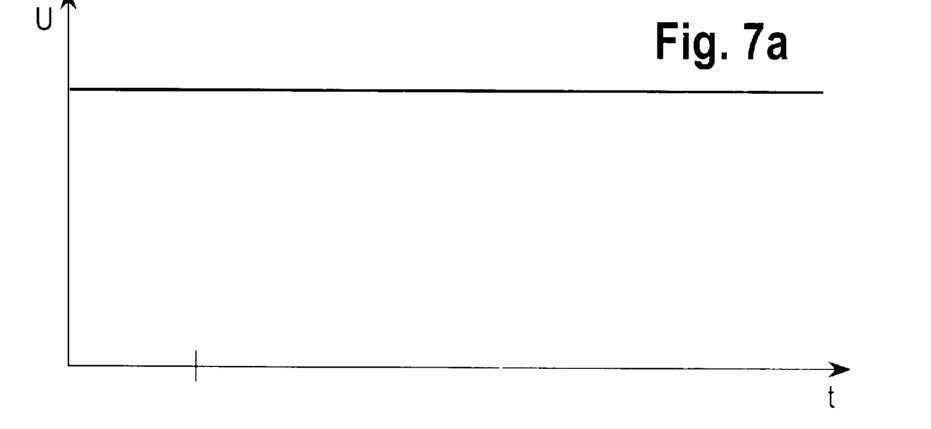
Figure 7B:
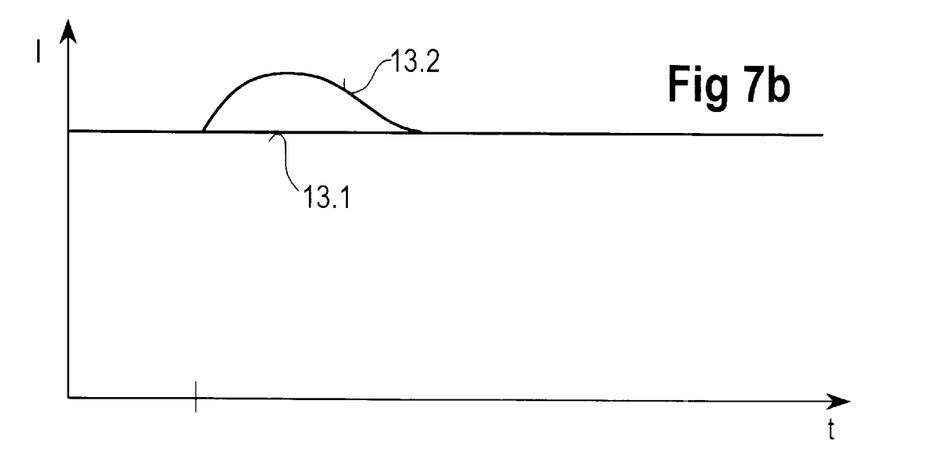
Figure 7C:
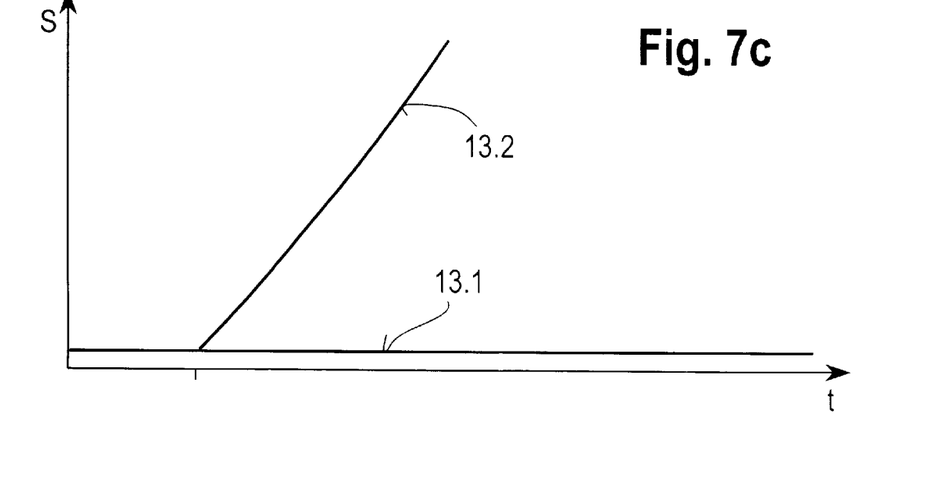

If work is done as in FIGS. 3a–3c via open-loop control of the current as a controlled electric power parameter, then the result, as FIGS. 6a, 6b and 6c show, is the course 13.1 when the armature is in contact with the pole face of the holding electromagnet. Since the current is kept constant, the armature is not released from the pole face, and there is accordingly no change in the voltage. However, if the armature is released before the holding current is turned off, as represented by the curve 13.2 in FIG. 6c, then despite the constant supply of current, there is an incursion in the voltage represented by the curve 13.2 in FIG. 6c. Once again, there is a significant change in the course of the voltage. In FIG. 3b, which represents the applicable voltage course over the entire actuation time of a valve, this voltage incursion is expressed in a premature separation represented by the curve segment 13.2a.

If in accordance with the method described in conjunction with FIGS. 4a–4c, open-loop control of the voltage as a controlled power parameter is performed, then the result, as also shown in FIG. 5a for the controlled electric power parameter of "voltage", is correspondingly also a constant current, as shown in FIG. 5c, if the armature rests on the pole face, as has already been described in conjunction with FIGS. 6a–6c.

However, if the armature is released prematurely from the holding electromagnet, as represented by the course of motion 13.2 in FIG. 5c, then despite an applied voltage and a flowing current, the changing magnetic inductances cause a brief rise in the current represented by the elevation in 13.2 in FIG. 5b.

Figure 8A:
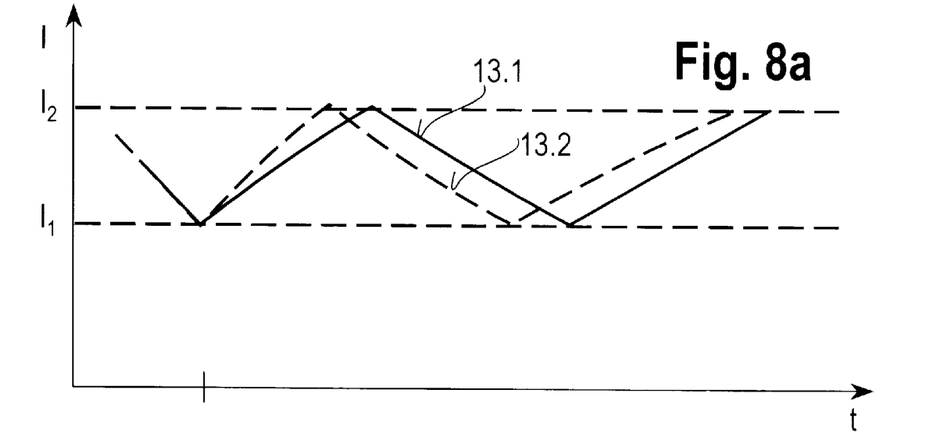
Figure 8B:
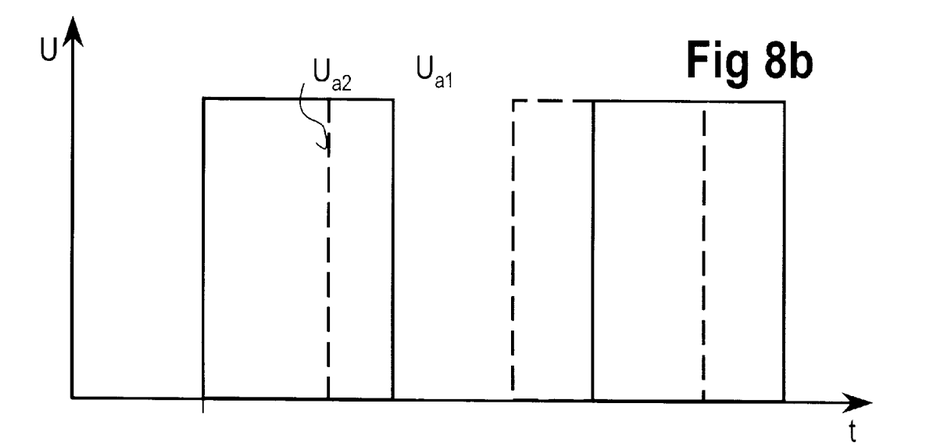
Figure 8C:
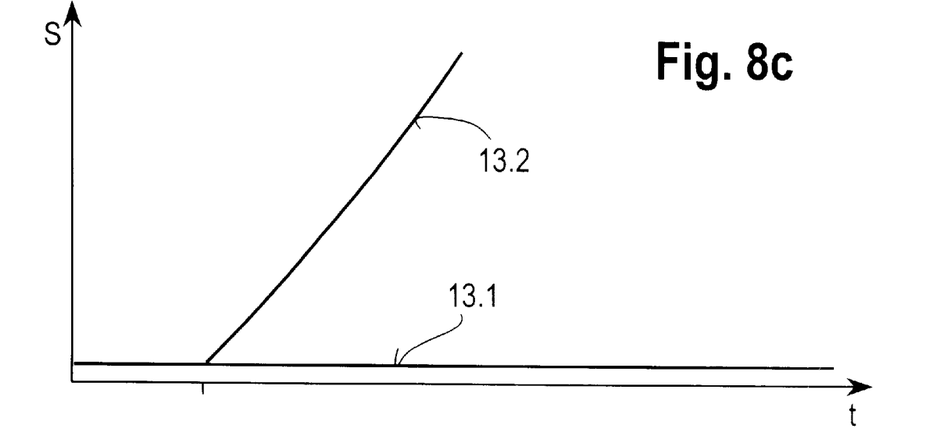

In open-loop control with a clocked current, as described in conjunction with FIGS. 5a–5c, the result, as shown in FIGS. 8a–8c, is a corresponding forward shift in the trailing edge of the voltage signal $U_{a2}$ relative to the timing of the leading edge $U_{a2}$ when the armature is properly in contact with the pole face.

The method for function monitoring has been described above in terms of an example of an electromagnetic actuator for actuating a gas exchange valve equipped with two electromagnets each oriented opposite one another. To perform the above-described method, it suffices, in order to reduce the circuitry expense, if the monitoring parameter for each electromagnetic actuator is picked up at only one electromagnet of one actuator. It becomes unnecessary to provide special sensors, since the actual values of the power parameter selected as a monitoring parameter can be detected directly in the electric control unit, and it is even possible for the varying parameters, which are proportional to the selected monitoring parameters, also to be picked up at individual switch elements in the electric controller.

To increase the reliability of the detection method, the voltage can be monitored in each case on the opposite side of the magnet actually to be monitored. If the armature drops, even though it ought to be held at the pole face of the first magnet, then it will oscillate all the way into the vicinity of the pole face of the second magnet. Because of the remanence of the magnet armature, a voltage is induced in the coil of the second magnet by the magnetic induction. That is, if such a voltage occurs in the coil of the second magnet at a time when the armature should be held against the first pole face, this is a reliable sign that the armature is dropped and is thus malfunctioning. Instead of voltage monitoring, it is also possible to monitor an induced current. That method functions precisely the same in principle, except that instead of the induced voltage, a current flow caused by an induced voltage is monitored.

If the remanence proves insufficient, then in the second magnet a current flow can be imposed, so that a magnetic field is present in each case. In this case as well, once again, both method of evaluation (voltage or current evaluation) are feasible. A change in the applicable value is then monitored in targeted fashion.

In a system with a plurality of inlet or outlet values per cylinder, the detection reliability can be increased by stopping one inlet valve, for instance, in alternation at low engine loads, so that each valve is moved at least every other cycle, and thus the failure detection based on the motion evaluation of FIGS. 3a–3c, 4a–4c and 5a–5c is assured.

However, the method is also applicable in electromagnetic actuators that each have only one electromagnet, which from a first functional position, defined by the restoring spring when the magnet is rendered currentless, assumes the second functional position by attraction of the armature when current is supplied to the electromagnet.

What is claimed is:

1. A method of monitoring the operation of an electromagnetic actuator moving a gas exchange valve of a cylinder of a piston-type internal combustion engine; the electromagnetic actuator including at least one electromagnet, a movable armature coupled to the gas exchange valve for moving the gas exchange valve, and at least one restoring spring opposing a motion of the armature; the method comprising the following steps:

(a) controlling a first electric power parameter of the electromagnet by an electric controller;

(b) monitoring a second electric power parameter as an actual value as a function of time; said second electric power parameter being a function of said first electric power parameter;

(c) storing, for a correct operation of the control, a theoretical value of said second electric power parameter as a function of time;
(d) comparing said actual value with said theoretical value;
(e) generating an actuating signal in the electric controller upon deviation of said actual value from said theoretical value; and
(f) upon determining, in step (d), a predetermined excess of a deviation between said actual and theoretical values, shutting off functions of said cylinder; said functions including at least one of fuel delivery, ignition, and operation of an additional gas exchange valve of said cylinder.

2. The method as defined in claim 1, wherein said first power parameter is the current flowing through the electromagnet and said second parameter is the voltage applied to said electromagnet.

3. The method as defined in claim 1, wherein said first power parameter is the voltage applied to said electromagnet and said second parameter is the current flowing through the electromagnet.

4. The method as defined in claim 2, further comprising the steps of clocking the current at least in an armature-holding phase between upper and lower current levels; further wherein step (b) comprises the step of monitoring, as said actual value, the course of the voltage rise of successive pulses.

5. The method as defined in claim 1, further comprising the step of re-regulating said first parameter upon determining, in step (d), an excess of a deviation between said actual and theoretical values.

6. The method as defined in claim 1, wherein the engine has a plurality of cylinders and further wherein the cylinder whose functions being shut off is a first cylinder and remaining said cylinders are second cylinders; further comprising the step of increasing power of said second cylinders upon shutting off functions of said first cylinder.

\* \* \* \* \*

UNITED STATES PATENT AND TRADEMARK OFFICE
CERTIFICATE OF CORRECTION

PATENT NO. : 6,510,037 B1 Page 1 of 1
DATED : January 21, 2003
INVENTOR(S) : Günter Schmitz It is certified that error appears in the above-identified patent and that said Letters Patent is hereby corrected as shown below:

<u>Title page,</u>
Please insert:
-- [22] PCT Filed: June 3, 1998
[86] PCT No.: PCT/EP98/03312
§ 371 (c) (1), (2), (4) Date: Feb. 4, 1999
[87] PCT Pub. No.: WO98/55752
PCT Pub. Date: Dec. 10, 1998 --.

Signed and Sealed this

Seventeenth Day of June, 2003

JAMES E. ROGAN
*Director of the United States Patent and Trademark Office*